(12) United States Patent
Yang et al.

(10) Patent No.: US 10,889,703 B2
(45) Date of Patent: Jan. 12, 2021

(54) LATEX COMPOSITION FOR DIP-MOLDING, AND MOLDED ARTICLE PREPARED FROM SAME

(71) Applicant: LG Chem, Ltd., Seoul (KR)

(72) Inventors: Seung Hun Yang, Daejeon (KR); Jung Eun Kim, Daejeon (KR); Won Tae Joe, Daejeon (KR); Wonsang Kwon, Daejeon (KR)

(73) Assignee: LG Chem, Ltd.

( * ) Notice: Subject to any disclaimer, the term of this patent is extended or adjusted under 35 U.S.C. 154(b) by 176 days.

(21) Appl. No.: 16/086,874

(22) PCT Filed: Aug. 23, 2017

(86) PCT No.: PCT/KR2017/009189
§ 371 (c)(1),
(2) Date: Sep. 20, 2018

(87) PCT Pub. No.: WO2018/043984
PCT Pub. Date: Mar. 8, 2018

(65) Prior Publication Data
US 2019/0106555 A1   Apr. 11, 2019

(30) Foreign Application Priority Data
Sep. 1, 2016  (KR) .......................... 10-2016-0112679

(51) Int. Cl.
| | | |
|---|---|---|
| *C08L 9/04* | (2006.01) | |
| *C08J 5/02* | (2006.01) | |
| *C08L 51/00* | (2006.01) | |
| *C08K 5/053* | (2006.01) | |
| *A41D 19/00* | (2006.01) | |
| *C08K 5/10* | (2006.01) | |
| *B29C 41/00* | (2006.01) | |
| *B29C 41/14* | (2006.01) | |
| *B29K 9/00* | (2006.01) | |
| *B29L 31/48* | (2006.01) | |

(52) U.S. Cl.
CPC ............ *C08L 9/04* (2013.01); *A41D 19/0055* (2013.01); *C08J 5/02* (2013.01); *C08K 5/053* (2013.01); *C08K 5/10* (2013.01); *C08L 51/00* (2013.01); *B29C 41/003* (2013.01); *B29C 41/14* (2013.01); *B29K 2009/00* (2013.01); *B29L 2031/4864* (2013.01); *C08J 2309/04* (2013.01)

(58) Field of Classification Search
CPC ....... C08L 9/04; C08L 51/00; A41D 19/0055; C08J 5/02; C08K 5/10
USPC .......................................................... 523/121
See application file for complete search history.

(56) References Cited

U.S. PATENT DOCUMENTS

| | | |
|---|---|---|
| 5,162,475 A | 11/1992 | Tang et al. |
| 5,508,365 A | 4/1996 | Fuse et al. |
| 5,610,212 A | 3/1997 | Tanaka et al. |
| 5,651,995 A | 7/1997 | Oyama et al. |
| 6,399,702 B1 | 6/2002 | Kucera et al. |
| 6,492,446 B1 | 12/2002 | Kajiwara et al. |
| 6,774,166 B1 | 8/2004 | Eichenauer et al. |
| 6,844,385 B1 | 1/2005 | Hagiwara et al. |
| 2003/0050377 A1 | 3/2003 | Hagiwara et al. |
| 2004/0110084 A1 | 6/2004 | Inomata et al. |
| 2006/0235158 A1 | 10/2006 | Ota et al. |
| 2007/0251422 A1 | 11/2007 | Maenaka et al. |
| 2008/0057049 A1 | 3/2008 | Krishnan |
| 2009/0269590 A1 | 10/2009 | Furukawa et al. |
| 2010/0063008 A1 | 3/2010 | Matteliano et al. |
| 2010/0138978 A1 | 6/2010 | Ikeda et al. |
| 2010/0152365 A1 | 6/2010 | Han et al. |
| 2010/0196709 A1 | 8/2010 | Yodogawa et al. |
| 2013/0165567 A1 | 6/2013 | Benighaus et al. |
| 2014/0302265 A1 | 10/2014 | Yang et al. |
| 2015/0225553 A1 | 8/2015 | Yang et al. |

FOREIGN PATENT DOCUMENTS

| | | |
|---|---|---|
| CA | 2376451 A1 | 12/2000 |
| CN | 1382186 A | 11/2002 |
| CN | 103421216 A | 12/2013 |
| CN | 104169354 A | 11/2014 |
| CN | 104341615 A | 2/2015 |
| JP | S51103184 A | 9/1976 |
| JP | H05320218 A | 12/1993 |
| JP | 2002501095 A | 1/2002 |
| JP | 2002139835 A | 5/2002 |
| JP | 2002284957 A | 10/2002 |
| JP | 2003502469 A | 1/2003 |
| JP | 3391116 B2 | 3/2003 |
| JP | 2006291019 A | 10/2006 |
| JP | 2007126613 A | 5/2007 |
| JP | 2010501672 A | 1/2010 |
| JP | 2010144278 A | 7/2010 |
| JP | 2012502108 A | 1/2012 |

(Continued)

OTHER PUBLICATIONS

International Search Report for Application No. PCT/KR2017/009189 dated Dec. 4, 2017.

(Continued)

*Primary Examiner* — Edward J Cain
(74) *Attorney, Agent, or Firm* — Lerner, David, Littenberg, Krumholz & Mentlik, LLP

(57) ABSTRACT

The present invention relates to a latex composition for dip-molding and a molded article produced therefrom. More specifically, the above composition can be used to prepare the dip-molded articles having gentle syneresis, no stickiness, and excellent chemical resistance by using monoglyceride.

10 Claims, No Drawings

(56) References Cited

FOREIGN PATENT DOCUMENTS

| JP | 2012201856 A | 10/2012 |
| JP | 5428150 B2 | 2/2014 |
| JP | 2014530289 A | 11/2014 |
| KR | 1019990005239 A | 6/1999 |
| KR | 20020012267 A | 1/2007 |
| KR | 20100066005 A | 6/2010 |
| KR | 101577501 B1 | 12/2015 |
| KR | 20160061125 A | 5/2016 |
| WO | 2004044037 A1 | 5/2004 |
| WO | 2005097870 A1 | 10/2005 |
| WO | 2011068394 A1 | 6/2011 |
| WO | 2016105112 A1 | 6/2016 |

OTHER PUBLICATIONS

Extended European Search Report including Written Opinion for Application No. EP17846909.4 dated Apr. 8, 2019.
Chinese Search Report for Application No. 201780025828.4 dated Mar. 27, 2020. 3 pages.

LATEX COMPOSITION FOR DIP-MOLDING, AND MOLDED ARTICLE PREPARED FROM SAME

CROSS-REFERENCE TO RELATED APPLICATIONS

The present application is a national phase entry under 35 U.S.C. § 371 of International Application No. PCT/KR2017/009189 filed on Aug. 23, 2017, which claims priority from Korean Patent Application No. 10-2016-0112679, filed on Sep. 1, 2016, the entire contents of which are incorporated herein by reference.

TECHNICAL FIELD

The present invention relates to a latex composition for dip-molding which can be used to prepare a dip-molded article with gentle syneresis, low stickiness and excellent tensile strength, and a molded article produced therefrom.

BACKGROUND ART

The disposable rubber gloves which are used in a variety of everyday life, such as housework, food industry, electronic industry, medical field are made by dip-molding of natural rubber or carboxylic acid-modified nitrile based copolymer latex. In recent years, the carboxylic acid-modified nitrile glove is attracting attention in the disposable glove market due to the problem of allergies of natural rubber and its unstable supply and demand.

Meanwhile, there are various attempts to increase the productivity of the gloves to meet the increasing demand of gloves. The most common attempt of these attempts is to maintain strength with lightening gloves. In the past, disposable nitrile gloves weighing approximately 4 grams were commonly used. However, at present, it is required to have a glove with a tensile strength of 6N or more by making it thin to the weight of approximately 3.2 g. However, it is not easy to obtain 6N tensile strength in the thin glove of 3.2 g even if an aging process is performed.

The preparation of gloves by dip-molding requires that after the dipping process, the cross-linking treatment is carried out in the oven and the cross-linking treatment is carried out for a long time in order to obtain a high tensile strength. However, since the cross-linking treatment is performed for a short time in order to reduce the cost and shorten the entire process time, it is difficult to ensure sufficient tensile strength only by the cross-linking treatment. Therefore, although various methods of adding cross-linkable materials to latex have been proposed, it has not yet been possible to obtain a satisfactory level of physical properties.

The gloves with the thin thickness along with the high level of tensile strength can be prepared by extremely lowering the concentrations of latex. However, when a dip-molding process is performed using a low-concentration latex, there is a problem that syneresis, which is a phenomenon in which water drops quickly during the formation of glove films, occurs severely and the prepared gloves also become sticky. This results in the formation of coagulated latex compositions, which create a large number of pinholes and thus increase the defective rate of gloves.

Therefore, there is a need for a technique to make gloves that do not tear easily even when the gloves are thin because there is no stickiness and tensile strength is high, while exhibiting good workability when making gloves.

PRIOR ART LITERATURE (Patent Document 1) Korean Patent Laid-Open No. 2010-0066005, "Rubber composition and rubber gloves prepared therefrom";

(Patent Document 2) WO 2011/068394, "Vulcanization accelerator and sulfur-free elastic rubber and rubber product"

DISCLOSURE

Technical Problem

As a result of various studies to solve the above problems, the inventors of the present invention confirmed that if hydrophobic monoglycerides with long-chain alkyl groups are added in the preparation of carboxylic acid-modified nitrile-based copolymer latex during or after copolymerization of latex and then dip-molding is performed, it is possible to prepare dip-molded articles with gentle syneresis, low stickiness and excellent chemical resistance, thereby completing the present invention.

Therefore, it is an object of the present invention to provide a latex composition for dip-molding comprising a carboxylic acid-modified nitrile based copolymer latex.

In addition, another object of the present invention is to provide a dip-molded article with gentle syneresis, low stickiness and excellent chemical resistance by preparing from the latex composition for dip-molding.

Technical Solution

In order to achieve the above object, the present invention provides latex compositions for dip-molding characterized by including carboxylic acid-modified nitrile based copolymer latex copolymerized from conjugated diene-based monomer, ethylenically unsaturated nitrile monomer and ethylenically unsaturated acid monomer, and monoglyceride.

At this time, the latex composition for dip-molding is characterized by containing 0.01 to 5 parts by weight of monoglyceride based on 100 parts by weight of carboxylic acid-modified nitrile based copolymer.

The monoglyceride is at least one selected from the group consisting of glycerol monolaurate, glycerol monostearate, glycerol monobehenate, glycerol monocaprylate, and glycerol monocaprate.

In addition, the present invention provides a dip-molded article characterized in that it is prepared by dip-molding the latex composition for dip-molding.

Advantageous Effects

The latex composition for dip-molding according to the present invention improves workability by using monoglyceride and thus achieving gentle syneresis during the dip-molding process using the latex composition.

The dip-molded article thus resulted is advantageous in that it is not sticky and has excellent resistance to chemicals (eg., hydrocarbon-based solvents), i.e., excellent chemical resistance.

The dip-molded article can be easily applied to industries in need thereof, such as inspection gloves, condoms, catheters, industrial gloves, household gloves and health care products.

Best Mode

Hereinafter, the present invention will be explained in more detail to assist the understanding thereof.

It will be understood that words or terms used in the specification and claims shall not be interpreted as limited to the meaning defined in commonly used dictionaries, and that the words or terms should be interpreted as having a meaning and concept that are consistent with the technical idea of the invention, based on the principle that an inventor may properly define the meaning of the words or terms to best explain the invention.

Latex Composition for Dip-Molding

The present invention proposes a latex composition for dip-molding comprising a carboxylic acid-modified nitrile based copolymer latex, which can improve workability in the dip-molding process and improve the physical properties of prepared dip-molded articles.

Light weighted dip-molded articles are obtained through dip-molding processes after preparation of low-concentration compositions, and at this time, syneresis occurs in the dip-molding process severely due to the low concentration during film formation, and the prepared dip-molded articles are sticky or when exposed to chemicals, problems such as denaturation or tearing occur. In the present invention, this problem is solved by the use of monoglyceride.

The monoglycerides referred to in the present specification mean a substance in which one glycerin is bonded to one fatty acid. The monoglyceride can be produced as various substances depending on the number of alkyls constituting the fatty acid, and when the unsaturated fatty acid is used, odor or stickiness can be induced. Therefore, the fatty acid can be preferably a saturated fatty acid, more preferably a compound having a C8 to C24 linear or branched alkyl group.

The long chain alkyl groups present in the molecular structure of monoglyceride exhibit hydrophobic properties, and because of this feature, the syneresis phenomenon in which the water drops quickly during the dip-molding process is prevented, and the surface stickiness of the prepared dip-molded article is prevented.

In particular, the latex composition for dip-molding of the present invention has excellent chemical resistance. The term "chemical resistance" is meant to be tolerable in the chemical environment. Polymeric materials tend to dissolve or soften in certain solvents, and this tendency is unpredictable in the case of copolymers copolymerized from various monomers. The present invention includes a carboxylic acid-modified nitrile based copolymer as described below which has high chemical resistance to certain solvents, hydrocarbon-based solvents. Examples of the hydrocarbon solvent include pentane, hexane, heptane, and cyclohexane. At this time, the excellent chemical resistance means that when a dip-molded article having the composition of the copolymer is exposed to a specific solvent (i.e., a hydrocarbon solvent), there is no denaturation on the surface, there is no deterioration in physical properties such as tensile strength, or tearing due to softening of the product does not occur.

The contents of hydrophobicity have been mentioned with respect to syneresis, stickiness and chemical resistance effects as mentioned above, but not all materials that exhibit hydrophobicity are usable. That is, the above-mentioned effect should be exhibited along with the hydrophobic property, and the stability of the latex should not be deteriorated even if it is added to the latex.

As a substance which can satisfy all of these requirements, monoglyceride is used in the present invention.

Usable monoglyceride is at least one selected from the group consisting of glycerol monolaurate, glycerol monostearate, glycerol monobehenate, glycerol monocaprylate, and glycerol monocaprate. Glycerol monolaurate or glycerol monostearate is preferably used.

Such monoglyceride is used in 0.01 to 5.0 parts by weight, preferably 0.1 to 5.0 parts by weight, relative to 100 parts by weight of carboxylic acid-modified nitrile based copolymer latex. If the content of the monoglyceride is less than the above range, the above-mentioned effects cannot be ensured. On the contrary, if it exceeds the above range, syneresis occurs and a dip-molded article having a sticky surface is produced. Therefore, the monoglyceride is suitably used within the above range.

The monoglyceride can be used in such a way to add to the latex before, during or after copolymerization of carboxylic acid-modified nitrile based copolymer, and it is preferable to add it in the copolymerization process in consideration of the stability of latex.

Hereinafter, the carboxylic acid-modified nitrile based copolymer will be described in more detail.

The carboxylic acid-modified nitrile-based copolymer is a copolymer copolymerized from conjugated diene-based monomer, ethylenically unsaturated nitrile monomer and ethylenically unsaturated acid monomer, as already mentioned.

First, the conjugated diene-based monomer is a monomer constituting the carboxylic acid-modified nitrile based copolymer according to the present invention. Specific examples thereof include at least one selected from the group consisting of 1,3-butadiene, 2,3-dimethyl-1,3-butadiene, 2-ethyl-1,3-butadiene, 1,3-pentadiene and isoprene. Among these, 1,3-butadiene and isoprene are preferable, and 1,3-butadiene is most preferably used.

The conjugated diene-based monomer can be included in an amount of from 40 to 89 wt. %, preferably from 45 to 80 wt. %, more preferably from 50 to 78 wt. %, based on the total weight of 100 wt. % of the total monomers constituting the carboxylic acid-modified nitrile-based copolymer. If the content is less than the above range, the dip-molded article becomes stiff and the wearing sensation deteriorates. On the contrary, if it exceeds the above range, the oil resistance of the dip-molded article deteriorates and the tensile strength decreases.

As other monomer constituting the carboxylic acid-modified nitrile based copolymer according to the present invention, the ethylenically unsaturated nitrile monomer is at least one selected from the group consisting of acrylonitrile, methacrylonitrile, fumaronitrile, α-chloronitrile and α-cyanoethyl acrylonitrile. Among these, acrylonitrile and methacrylonitrile are preferable, and acrylonitrile is most preferably used.

The ethylenically unsaturated nitrile monomer can be included in an amount of 10 to 50 wt. %, preferably 15 to 45 wt. %, more preferably 20 to 40 wt. % based on the total weight of 100 wt. % of the total monomers constituting the carboxylic acid-modified nitrile-based copolymer. If the content is less than the above range, the oil resistance of the dip-molded article deteriorates and the tensile strength decreases. On the contrary, if it exceeds the above range, the dip-molded article becomes stiff and the wearing sensation deteriorates.

Also, as other monomer constituting the carboxylic acid-modified nitrile based copolymer according to the present invention, the ethylenically unsaturated acid monomer is an ethylenically unsaturated acid monomer containing at least one acidic group selected from the group consisting of a carboxyl group, a sulfonate group and an acid anhydride group. The ethylenically unsaturated acid monomer includes, for example, the ethylenically unsaturated carboxylic acid monomer such as acrylic acid, methacrylic acid, itaconic acid, maleic acid, or fumaric acid; polycarboxylic anhydrides such as maleic anhydride and citraconic anhydride; ethylenically unsaturated sulfonic acid monomers such as styrene sulfonate; ethylenically unsaturated polycarboxylic acid partial ester monomers such as monobutyl fumarate, monobutyl maleate and mono-2-hydroxypropyl maleate. Among these, methacrylic acid is particularly preferable. These ethylenically unsaturated acid monomers can be used in the form of alkali metal salts or ammonium salts, etc.

The ethylenically unsaturated acid monomer can be included in an amount of 0.1 to 10 wt. %, preferably 0.5 to 9 wt. %, more preferably 1 to 8 wt. % based on the total weight of 100 wt. % of the total monomers constituting the carboxylic acid-modified nitrile-based copolymer. If the content is less than the above range, the tensile strength of the dip-molded article decreases. On the contrary, if it exceeds the above range, the dip-molded article becomes stiff and the wearing sensation deteriorates.

The carboxylic acid-modified nitrile based copolymer according to the present invention may optionally further comprise other ethylenically unsaturated monomer capable of copolymerizing with the ethylenically unsaturated nitrile monomer and the ethylenically unsaturated acid monomer.

The copolymerizable ethylenically unsaturated monomer may include at least one selected from the group consisting of vinyl aromatic monomers including styrene, alkyl styrene and vinyl naphthalene; fluoroalkyl vinyl ether including fluoroethyl vinyl ether; ethylenically unsaturated amide monomer including (meth)acrylamide, N-methylol (meth)acrylamide, N,N-dimethylol (meth)acrylamide, N-methoxy methyl(meth)acrylamide and N-propoxy methyl(meth)acrylamide; non-conjugated diene monomer including vinyl pyridine, vinyl norbornene, dicyclopentadiene and 1,4-hexadiene; and ethylenically unsaturated carboxylic ester monomer including methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxyethyl (meth)acrylate, hydroxypropyl (meth)acrylate, glycidyl (meth)acrylate and dimethylamino ethyl(meth)acrylate.

The ethylenically unsaturated nitrile monomer and other ethylenically unsaturated monomer copolymerizable therewith can be used in an amount of 0.001 to 20 wt. % based on the total weight of 100 wt. % of the total monomers constituting the carboxylic acid-modified nitrile-based copolymer. If the content exceeds 20 wt. %, the balance between the soft wearing sensation and the tensile strength does not fit well. Therefore, the content is properly selected within the above range.

The carboxylic acid-modified nitrile based copolymer latex of the present invention can be prepared by emulsion polymerization by adding an emulsifier, a polymerization initiator, or molecular weight modifier to the monomer constituting the carboxylic acid-modified nitrile based copolymer, as already mentioned.

Specifically, the carboxylic acid-modified nitrile based copolymer latex is prepared through the steps comprising, step (a): adding a conjugated diene-based monomer, an ethylenically unsaturated nitrile monomer and an ethylenically unsaturated acid monomer, an emulsifier, a polymerization initiator and deionized water to a polymerization reactor;

step (b): performing emulsion polymerization; and step (c): stopping the polymerization.

In the step (a), the conjugated diene-based monomer, the ethylenically unsaturated nitrile monomer, the ethylenically unsaturated acid monomer, the emulsifier, and the polymerization initiator may be introduced into the polymerization reactor all at once or continuously. In addition, they can be added to the polymerization reactor all at once, or the content of some of them is added to the polymerization reactor and then the remaining content can be continuously supplied to the polymerization reactor again.

The emulsifier is not particularly limited, but anionic surfactants, nonionic surfactants, cationic surfactants, and amphoteric surfactants can be used as emulsifiers. Among these, the anionic surfactants selected from the group consisting of alkylbenzene sulfonates, aliphatic sulfonates, sulfuric acid ester salts of higher alcohols, α-olefin sulfonates and alkyl ether sulfuric acid ester salts are particularly preferably used.

At this time, the emulsifier is used in an amount of 0.3 to 10 parts by weight, preferably 0.8 to 8 parts by weight, more preferably 1.5 to 6 parts by weight, based on 100 parts by weight of the monomers constituting the carboxylic acid-modified nitrile based copolymer. If the content is less than the above range, the stability at the time of polymerization is lowered. On the contrary, if it exceeds the above range, there is a problem that it is difficult to prepare a dip-molded article due to the occurrence of a large amount of foam.

The polymerization initiator is not particularly limited, but a radical initiator can be used specifically. The radical initiator may include at least one selected from the group consisting of inorganic peroxides such as sodium persulfate, potassium persulfate, ammonium persulfate, potassium perphosphate and hydrogen peroxide; organic peroxides such as t-butyl peroxide, cumene hydroperoxide, p-menthane hydroperoxide, di-t-butyl peroxide t-butylcumyl peroxide, acetyl peroxide, isobutyl peroxide, octanoyl peroxide, dibenzoyl peroxide, 3,5,5-trimethylhexanol peroxide and t-butylperoxy isobutyrate; azobisisobutyronitrile, azobis-2,4-dimethylvaleronitrile, azobiscyclohexanecarbonitrile and methyl azobisisobutyrate. Among these radical initiators, inorganic peroxides are more preferable, and persulfates are particularly preferable.

The polymerization initiator is used in an amount of 0.01 to 2 part by weight, preferably 0.02 to 1.5 part by weight, based on 100 parts by weight of the total monomers constituting the carboxylic acid-modified nitrile based copolymer. If the content is less than the above range, the polymerization rate is lowered and thus it is difficult to produce the final product. On the contrary, if it exceeds the above range, the polymerization rate is too fast to control the polymerization.

The activating agent is not particularly limited and those ordinarily known in the art can be used. The examples thereof may include at least one selected from the group consisting of sodium formaldehyde sulfoxylate, sodium ethylenediamine tetraacetate, ferrous sulfate, dextrose, sodium pyrophosphate, and sodium sulfite.

The molecular weight modifier is not particularly limited, and for example, may include α-methylstyrene dimers; mercaptans, such as t-dodecyl mercaptan, n-dodecyl mercaptan and octyl mercaptan; halogenated hydrocarbons, such as carbon tetrachloride, methylene chloride and methylene bromide; and sulfur-containing compounds, such as tetraethylthiuram disulfide, dipentamethylenethiuram disulfide and diisopropylxanthogene disulfide. These molecular weight modifiers may be used alone or in combination of two or more. Among these, mercaptans are preferable, and t-dodecyl mercaptan may be more preferably used.

The amount of the molecular weight modifier used varies depending on the kind thereof, but may be preferably 0.1 to 2.0 parts by weight, preferably 0.2 to 1.5 parts by weight, more preferably 0.3 to 1.0 parts by weight based on 100 parts by weight of the total monomers constituting the carboxylic acid-modified nitrile based copolymer. If the content is less than the above range, the physical properties of the dip-molded article are significantly deteriorated. On the contrary, if it exceeds the above range, there is a problem that the polymerization stability is lowered.

At this time, the monoglyceride can be added during polymerization of the latex of the present invention.

In addition, it is of course possible to add minor materials such as a chelating agent, a dispersing agent, a pH adjusting agent, a deoxidizing agent, a particle diameter adjusting agent, an anti-aging agent, and an oxygen scavenger, as needed.

The method of introducing the monomer mixture constituting the carboxylic acid-modified nitrile-based copolymer is not particularly limited, and may be any of a method in which the monomer mixture is introduced all at once into the polymerization reactor, a method in which the monomer mixture is continuously introduced into the polymerization reactor, a method in which a part of the monomer mixture is introduced into the polymerization reactor and the remaining monomer is continuously introduced to the polymerization reactor.

In the step (b), the polymerization temperature during the emulsion polymerization may be generally from 10 to 90° C., preferably from 20 to 80° C., more preferably 25 to 75° C., but is not particularly limited.

In the step (c), the conversion at the termination of the polymerization reaction may be 85% or more, preferably 88 to 99.9%, more preferably 90 to 99%. After the polymerization is stopped, unreacted monomers are removed and the solid content and pH are adjusted to obtain carboxylic acid-modified nitrile based copolymer latex for dip-molding.

The carboxylic acid-modified nitrile based copolymer latex has a glass transition temperature of −50° C. to −15° C. If the glass transition temperature of the latex is less than the above range, the tensile strength is remarkably lowered or the wearing sensation is deteriorated due to the stickiness of the gloves. On the contrary, if it is higher than the above range, a crack is generated in the dip-molded article, which is undesirable. The glass transition temperature can be adjusted by controlling the content of the conjugated diene monomer, and can be measured by differential scanning calorimetry.

The particle diameter of the carboxylic acid-modified nitrile based copolymer latex may be 50 to 500 nm. If the particle diameter of the latex for dip-molding is within the above range, the tensile strength of the prepared dip-molded article can be improved. At this time, the particle diameter of the latex for dip-molding can be adjusted by controlling the kind and content of the emulsifier, and the particle diameter can be measured by Laser (Laser Scattering Analyzer, Nicomp).

The carboxylic acid-modified nitrile based copolymer latex prepared by the above step is mixed with monoglyceride to prepare the latex composition for dip-molding.

The zinc peroxide cross-linking agent may be added to the latex as it is in the form of powder or may be added to the latex after being prepared in the form of an aqueous dispersion for uniform mixing.

The aqueous dispersion is prepared by adding a dispersant to water and adding a zinc peroxide-based cross-linking agent thereto, and is used after uniformly dispersing the particles through a ball mill process and thus improving dispersion stability. At this time, the dispersing agent is not particularly limited in the present invention, and any dispersing agent may be used as long as it is a known dispersing agent. As an example, alkyl (C8-12) benzenesulfonate, alkyl (C3-6) naphthalene sulfonate, dialkyl (C3-6) naphthalene sulfonate, dialkyl (C8-12) sulfosuccinate, lignin sulfonate, naphthalene sulfosuccinate formalin condensates, alkylC8-12) naphthalene sulfonate formalin condensates, sodium or calcium salts of sulfonates such as polyoxyethylene alkyl (C8-12) phenylsulfonate, sodium or calcium salts of sulfates such as alkyl(C8-12) sulfate, polyoxyethylene alkyl(C8-12) sulfate, polyoxyethylene alkyl (C8-12) phenyl sulfate, sodium salt or calcium salts of succinate such as polyoxyalkylenesuccinate, polyoxyethylene alkyl (C8-12) ether, polyoxyethylene alkyl (C8-12) phenyl ether, polyoxyethylene alkyl (C8-12) phenyl polymer may be used alone or in combination of two or more. Beta-naphthalenesulfonic acid formalin condensate sodium salt is preferably used.

If necessary, various additives such as an antiaging agent, an antioxidant, an antiseptic, an antibacterial agent, a wetting agent, a thickener, a dispersant, a pigment, a dye, a filler, a reinforcing agent and a pH adjuster may be added to the latex composition for dip-molding in a predetermined amount.

The latex composition for dip-molding according to the present invention has a solid concentration of 5 to 40 wt. %, preferably 8 to 35 wt. %, more preferably 10 to 33 wt. %. If the concentration is too low, the transport efficiency of the latex composition will decrease. If it is too high, the solid concentration may cause an increase in viscosity, and it may cause problems such as storage stability and the like. Therefore, the concentration is appropriately adjusted within the above range.

The pH of the latex composition for dip-molding may be 8 to 12, preferably 8.5 to 11.5, more preferably 9 to 11. If the pH is out of the above range, stability of the latex composition for dip-molding may be deteriorated.

At this time, the pH of the latex composition for dip-molding can be adjusted by adding, when preparing the latex for dip-molding, a certain amount of a pH adjusting agent. As the pH adjuster, 1 to 5% aqueous potassium hydroxide solution or 1 to 5% aqueous ammonia may be used.

Dip-Molded Article

In addition, the present invention provides a dip-molded article made from the latex composition for dip-molding.

The dip-molded article according to one embodiment of the present invention is not particularly limited and can be prepared by a method commonly known in the art, and for example, can be prepared by using a direct dipping method, an anode coagulation dipping method, a Teague's coagulation dipping method or the like. Preferably, the anode coagulation dipping method can be used. In the case of producing the dip-molded article using the anode coagulation dipping method, there is an advantage that the dip-molded article having a uniform thickness can be produced.

As a specific example, the dip-molded article can be prepared through steps comprising, immersing the hand-shaped mold for dip-molding in the coagulant solution and adhering the coagulant to the surface of the mold for dip-molding (step a);

immersing the dip-molding mold having the coagulant adhering to the surface thereof in the latex composition for dip-molding to form a dip-molding layer (step b); and heat-treating the dip-molding layer to cross-link the latex resin (step c).

Step (a) is a step for adhering a coagulant to the surface of the hand-shaped mold for dip-molding, and is not particularly limited, but may be carried out by dipping the mold for dip-molding in the coagulant solution for at least one minute and taking out the mold and then drying at 70 to 150° C.

The coagulant solution is a solution in which the coagulant is dissolved in water, an alcohol or a mixture thereof, and may generally contain 5 to 50 wt. % of coagulant, preferably 10 to 40 wt. % of coagulant.

The above-mentioned coagulant is not particularly limited, and for example include metal halides such as barium chloride, calcium chloride, magnesium chloride, zinc chloride and aluminum chloride; nitrates such as barium nitrate, calcium nitrate and zinc nitrate; acetates such as barium acetate, calcium acetate and zinc acetate; and sulfates such as calcium sulfate, magnesium sulfate and aluminum sulfate. Calcium chloride, calcium nitrate and the combination thereof are preferred.

The step (b) is a step for forming the dip-molding layer of the latex composition for dip-molding according to the present invention on the mold for dip-molding in which the coagulant is adhered, and in the step (b), the dip-molding layer may be formed by immersing the coagulant-adhered mold for dip-molding in the latex composition for dip-molding for at least one minute and then taking out the mold.

The step (c) is a step for obtaining the dip-molded article by cross-linking the latex resin to the dip-molding layer and may be performed by heat-treating the dip-molding layer.

The heat-treating is not particularly limited, but may be performed by, for example, performing a first heat-treating at 70 to 150° C. for 1 minute to 10 minutes and then a second heat-treating at 100 to 180° C. for 5 minutes to 30 minutes.

During the heat-treating, the water component is first evaporated from the dip-molding layer, and the latex resin of the dip-molding layer is hardened through cross-linking, thereby obtaining the dip-molded article.

The dip-molded article is not particularly limited and may be applied to various latex industries, and for example, may be applied to at least one molded article selected from the group consisting of inspection gloves, condoms, catheters, industrial gloves, surgical gloves, household gloves, industrial gloves and health care products.

Hereinafter, preferred examples will be provided for better understanding of the present invention. It will be apparent to those skilled in the art that the following examples are only provided to illustrate the present invention, and various modifications and alternations are possible within the scope and technical range of the present invention. Such modifications and alternations are intended to fall within the scope of the appended claims.

EXAMPLES

Example 1

Preparation of Latex Composition for Dip-Molding and Dip-Molded Article (Preparation of Carboxylic Acid-Modified Nitrile Based Copolymer Latex)

A 10 L high-pressure reactor equipped with a stirrer, a thermometer, a condenser, and an inlet of nitrogen gas and configured to continuously feed a monomer, an emulsifier, and a polymerization initiator was replaced with nitrogen. Thereafter, to the high-pressure reactor, 3 parts by weight of sodium alkylbenzenesulfonate, 0.1 parts by weight of glycerol monostearate, 0.5 part by weight of t-dodecyl mercaptan and 140 parts by weight of ion-exchanged water, relative to 100 parts by weight of the monomer mixture of 28 wt. % of acrylonitrile, 67 wt. % of 1,3-butadiene, 5 wt. % of methacrylic acid were added and the temperature was raised to 38° C.

After raising the temperature, 0.3 parts by weight of potassium persulfate as a polymerization initiator was added. When the conversion rate reached 95%, the polymerization was stopped by adding 0.1 part by weight of sodium dimethyl dithiocarbamate. Unreacted monomers were removed through a deodorization process, and ammonia water, an antioxidant and a defoaming agent were added to obtain a carboxylated acrylonitrile-butadiene based copolymer latex having a solid concentration of 45% and pH of 8.5.

(Preparation of Latex Composition for Dip-Molding)

To the prepared carboxylic acid-modified nitrile based copolymer latex of 100 parts by weight, 3% potassium hydroxide solution and a suitable amount of dispersant and secondary distilled water were added to obtain a latex composition for dip-molding having a solid concentration of 15% and pH of 10.

(Preparation of Dip-Molded Article)

The coagulant solution was prepared by mixing 13 parts by weight of calcium nitrate, 82.5 parts by weight of distilled water, and 0.5 parts by weight of a wetting agent (Teric 320 produced by Huntsman Corporation, Australia). A hand-shaped ceramic mold was immersed in this solution for 1 minute, taken out and then dried at 100° C. for 4 minutes to adhere the coagulant to the hand-shaped mold.

Next, the mold coated with the coagulant was immersed in the composition for dip-molding for 1 minute, pulled up, dried at 130° C. for 4 minutes, and immersed in water or warm water for 3 minutes. When drying at 130° C. for 4 minutes, the time of dropping of water droplets was checked to confirm the syneresis time. Again, the mold was dried at 130° C. for 3 minutes and then cross-linked at 130° C. for 20 minutes. The stickiness of the cross-linked dip-molding layer was measured while taking off it from the hand-shaped mold, and thus obtained a glove-shaped dip-molded article.

Example 2

Preparation of Latex Composition for Dip-Molding and Dip-Molded Article

A latex composition for dip-molding was prepared in the same manner as in Example 1 except that glycerol monolaurate instead of glycerol monostearate was used in a ratio

Example 3

Preparation of Latex Composition for Dip-Molding and Dip-Molded Article

A latex composition for dip-molding was prepared in the same manner as in Example 1 except that glycerol monostearate was used in a ratio of 0.01 parts by weight, and using this, a glove-shaped dip-molded article was prepared.

Example 4

Preparation of Latex Composition for Dip-Molding and Dip-Molded Article

A latex composition for dip-molding was prepared in the same manner as in Example 1 except that glycerol monostearate was used in a ratio of 1.0 part by weight, and using this, a glove-shaped dip-molded article was prepared.

Example 5

Preparation of Latex Composition for Dip-Molding and Dip-Molded Article

A latex composition for dip-molding was prepared in the same manner as in Example 1 except that glycerol monostearate was used in a ratio of 5 parts by weight, and using this, a glove-shaped dip-molded article was prepared.

Example 6

Preparation of Latex Composition for Dip-Molding and Dip-Molded Article

A latex composition for dip-molding was prepared in the same manner as in Example 1 except that glycerol monostearate was used in a ratio of 0.1 parts by weight after polymerization rather than during polymerization, and using this, a glove-shaped dip-molded article was prepared.

Example 7

Preparation of Latex Composition for Dip-Molding and Dip-Molded Article

A latex composition for dip-molding was prepared in the same manner as in Example 1 except that glycerol monostearate was used in a ratio of 0.1 parts by weight during polymerization and in a ratio of 0.1 parts by weight after polymerization, and using this, a glove-shaped dip-molded article was prepared.

Example 8

Preparation of Latex Composition for Dip-Molding and Dip-Molded Article

A latex composition for dip-molding was prepared in the same manner as in Example 1 except that glycerol monostearate was used in a ratio of 7 parts by weight, and using this, a glove-shaped dip-molded article was prepared.

Comparative Example 1

Preparation of Latex Composition for Dip-Molding and Dip-Molded Article

A latex composition for dip-molding was prepared in the same manner as in Example 1 except that during polymerization in Example 1, 0.1 part by weight of glycerol monostearate was not used, and using this, a glove-shaped dip-molded article was prepared.

Experimental Example 1

Evaluation of Physical Properties of Dip-Molded Article

The physical properties of the dip-molded articles prepared in the above Examples and Comparative Example were measured. The result is shown in Table 1.

(1) Syneresis (sec)

In order to check syneresis time, the mold coated with the coagulant was immersed in the composition for dip-molding for 15 seconds, pulled up, dried at 120° C. for 4 minutes, and then the time of dropping of water droplets was checked to confirm the syneresis time. In this time, the longer syneresis time means the better workability.

(2) Stickiness (10-Score Method)

At the time of preparation of the dip-molded article, the stickiness was recorded by a 10-score method while taking off the dip-molding layer from the hand-shaped mold. The higher the score means the less sticky. At this time, score 1 means sticky, score 10 means not sticky, and larger value is more advantageous.

(3) Chemical Resistance (min)

Test pieces were prepared from dip-molded articles of Examples 1 to 8 and Comparative Example 1 in accordance with EN374-3: 2003. Thereafter, the chemical resistance of this test piece was measured by passing the hexane through the GC-FID and measuring the time taken for the hexane to permeate the test piece at a rate of 1 µg/cm²/min in minutes. At this time, the longer the time means the better the chemical resistance.

TABLE 1

|  | Syneresis (Sec.) | Stickiness (10-score method) | Chemical resistance (min) |
| --- | --- | --- | --- |
| Example 1 | 145 | 7 | 12 |
| Example 2 | 120 | 7 | 11 |
| Example 3 | 75 | 5 | 9 |
| Example 4 | >360 | 9 | 15 |
| Example 5 | >360 | 8 | 22 |
| Example 6 | 121 | 8 | 10 |
| Example 7 | 183 | 9 | 13 |
| Example 8 | 52 | 3 | 20 |
| Comparative Example 1 | 48 | 2 | 7 |

As shown in the results of Table 1 above, when the monoglyceride disclosed in the present invention was used, the physical properties of syneresis, stickiness and chemical resistance were superior to those of Comparative Example 1.

The latex composition for dip-molding according to the present invention can be used for preparation of latex articles, for example, health care products such as various industrial and household gloves.

The invention claimed is:

1. A latex composition for dip-molding comprising:
a carboxylic acid-modified nitrile based copolymer latex copolymerized from conjugated diene-based monomers, ethylenically unsaturated nitrile monomers and ethylenically unsaturated acid monomers, and monoglyceride.

2. The latex composition for dip-molding according to claim 1, wherein the latex composition for dip-molding contains 0.01 to 5 parts by weight of the monoglyceride based on 100 parts by weight of the carboxylic acid-modified nitrile based copolymer.

3. The latex composition for dip-molding according to claim 1, wherein the monoglyceride is at least one selected from the group consisting of glycerol monolaurate, glycerol monostearate, glycerol monobehenate, glycerol monocaprylate, and glycerol monocaprate.

4. The latex composition for dip-molding according to claim 1, wherein the carboxylic acid-modified nitrile-based copolymer is copolymerized from 40 to 89 wt % of the conjugated diene-based monomer, 10 to 50 wt % of the ethylenically unsaturated nitrile monomer and 0.1 to 10 wt % of the ethylenically unsaturated acid monomer based on a total sum of 100% by weight of monomers.

5. The latex composition for dip-molding according to claim 1, wherein the conjugated diene-based monomer is at least one selected from the group consisting of 1,3-butadiene, 2,3-dimethyl-1,3-butadiene, 2-ethyl-1,3-butadiene, 1,3-pentadiene and isoprene.

6. The latex composition for dip-molding according to claim 1, wherein the ethylenically unsaturated nitrile monomer is at least one selected from the group consisting of acrylonitrile, methacrylonitrile, fumaronitrile, α-chloronitrile and α-cyanoethyl acrylonitrile.

7. The latex composition for dip-molding according to claim 1, wherein the ethylenically unsaturated acid monomer is at least one selected from the group consisting of acrylic acid, methacrylic acid, itaconic acid, maleic acid, fumaric acid, maleic anhydride, citraconic anhydride, styrene sulfonate, monobutyl fumarate, monobutyl maleate and mono-2-hydroxy propyl maleate.

8. The latex composition for dip-molding according to claim 1, wherein the carboxylic acid-modified nitrile based copolymer is copolymerized with adding additionally an ethylenically unsaturated monomer as a comonomer.

9. A dip-molded article prepared by dip-molding the latex composition for dip-molding according to claim 1.

10. The dip-molded article according to claim 9, wherein the dip-molded article is at least one selected from the group consisting of an inspection glove, a condom, a catheter, an industrial glove, a surgical glove, a household glove, an industrial glove and a health care product.

* * * * *